United States Patent [19]

Calvin

[11] 4,151,078

[45] Apr. 24, 1979

[54] REMOVING OIL FROM WATER

[75] Inventor: Donald W. Calvin, Zachary, La.

[73] Assignee: The Dow Chemical Company, Midland, Mich.

[21] Appl. No.: 824,003

[22] Filed: Aug. 12, 1977

Related U.S. Application Data

[63] Continuation-in-part of Ser. No. 730,556, Oct. 7, 1976, abandoned.

[51] Int. Cl.$^2$ .............................................. C02B 9/02
[52] U.S. Cl. ..................................... 210/30 A; 210/36; 210/40; 210/DIG. 26
[58] Field of Search ............. 210/30 A, 40, DIG. 26, 210/36, 242 AS, 502; 423/336, 337, 335

[56] References Cited

U.S. PATENT DOCUMENTS

| | | | |
|---|---|---|---|
| 2,535,036 | 12/1950 | Broughton | 423/336 |
| 3,203,759 | 8/1965 | Flemmert | 423/337 |
| 3,484,371 | 12/1969 | Biegler et al. | 210/DIG. 26 |
| 3,562,153 | 2/1971 | Tully et al. | 210/DIG. 26 |
| 3,752,762 | 8/1973 | Cincotta | 210/DIG. 26 |

FOREIGN PATENT DOCUMENTS 47-15026  5/1972  Japan ........................................ 210/40

Primary Examiner—Charles N. Hart
Assistant Examiner—Ivars Cintins
Attorney, Agent, or Firm—W. J. Lee

[57] ABSTRACT

Hydrophobic silica, containing sorbed HF values, is used to remove oil from water by sorption of the oil onto the silica and then separating the oil/silica mixture from the water. Furthermore, the present invention pertains to recovering the silica from the oil by aqueous treatment in such a manner that the hydrophobicity of the silica is overcome and the silica becomes hydrophilic, thereby releasing the oil.

4 Claims, No Drawings

REMOVING OIL FROM WATER

This application is a continuation-in-part of Ser. No. 730,556 filed Oct. 7, 1976, now abandoned.

CROSS-REFERENCE TO RELATED APPLICATIONS

In my co-filed application, Ser. No. 730,541 filed Oct. 7, 1976 titled "Method of Preparing Hydrophobic Silica", now U.S. Pat. No. 4,054,689, it is shown that fine-particle silica may be rendered hydrophobic by being treated with anhyrous gaseous HF, thereby sorbing HF values onto the silica. This said co-filed application is incorporated herein by reference.

BACKGROUND OF THE INVENTION

There have been numerous attempts to find efficient, economical methods for removing oil from water, especially when the oil appears to be environmentally or ecologically detrimental. Adside from the possible danger to animal life, plant life, or marine life, oil in waterways can be a fire hazard, can present chemical problems to segments of the public or industry who may use the water in various processes, and can be wasteful and a general nuisance. In some cases, exotic or expensive oils need to be saved from loss.

Among the many methods which have been taught and proposed for removing oil from water have been the use of various sorption agents or sorptives, such as wood chips, sawdust, sulfur, polymeric substances, cellulosic substances, and many others. Many of the proposed sorptives are not salvageable or re-usable and are intended to be destroyed or discarded along with the sorbed oil. In some cases, it is possible to recover a fair amount of the oil from the sorptive by draining, squeezing, or washing with a solvent. Even when some of the oil is recovered from the sorptive, the sorptive along with residual oil is generally intended to be discarded or destroyed.

There exists a need for a sorption agent (sorptive) from which the sorbed oil can be easily removed and which is further useful.

It is an object of the present invention to provide a sorptive for removal of oil from water.

It is a further object to provide a sorptive from which the oil can be substantially completely recovered.

A still further object is to provide a sorptive which is again useful after the oil has been removed.

Yet another object is to provide a sorptive which can be treated so as to render it useful again as a sorptive for removing oil from water.

These and other objects are attained by the present invention as described herein.

SUMMARY OF THE INVENTION

Fine particle size silica which contains sorbed HF values and which is hydrophobic is brought into contact with a mixture of oil and water. The oil becomes sorbed on the silica and the oil-laden silica is removed from the water.

The oil-laden hydrophobic silica may then be treated with water for a period of time sufficient to overcome the hydrophobicity of the silica, and when it becomes hydrophilic by losing its hydrophobicity, it goes into the water and allows the oil to remain on the surface of the water where it can be recovered.

The silica, now hydrophilic, may be separated from the water and put to further use or it may be treated to render it hydrophobic again.

DETAILED DESCRIPTION OF THE INVENTION

Fine particle size hydrophobic silica ($SiO_2$) containing sorbed HF values is added to water which contains oil. The silica sorbs the oil and the silica/oil mixture floats on top of the water where it can be scooped off or otherwise substantially separated from the water. The oil and silica may then be conveniently separated by being placed back into water and allowed to stand for an extended period of time until the silica loses its hydrophobicity, becomes hydrophilic, and goes into the water phase leaving the oil floating on the water. The oil may then be removed for further handling and the silica may then be separated from the water for further handling.

Throughout this disclosure, the expression "oil" is meant to include liquid hydrocarbons, e.g. gasoline, kerosene, fuel oil, crude oil, paraffinic oils, vegetable oils, and the like and also includes such water-immiscible liquids as xylene, toluene, styrene, alkylbenzenes, naphtha, naphthenic compounds, liquid organic polymers, and the like.

The water, which contains the oil desired to be separated, may be a river, lake, effluent ditch, bay, holding tank or process stream. Waters containing dissolved ingredients and saline waters, e.g., brines, seawater, estuaries, and the like are within the purview of the present invention.

The ratio of oil to water is not particularly significant except that there should be enough of one with the other to be considered as being something more than "insignificant" for the present invention to be economically practical. In instances where there is a relatively small amount of water to oil, a water phase may form at the bottom; this water layer may be drawn off, generally along with a small amount of the oil, and then the so-removed water layer may be treated according to the present invention to remove any oil which may have been drawn off the water. Usually, however, the oil desired to be separated from water involves a relatively small amount of oil in a large amount of water.

In most instances, it is desired to remove as much oil from the water as is reasonably possible; in these cases some water may be taken along with the silica/oil mixture. In the present invention this is not generally a problem because the convenient manner of separating the oil from the silica involves adding enough water so that it will take up the silica when the silica reverts from hydrophobic to hydrophilic, allowing the oil to remain floating on top of the water in the separation apparatus.

The process may be operated batchwise, continuously, intermittently, or by continuous batching. A number of separative steps may be employed and the final water phase, which may still contain very small amounts of oil, may be re-cycled back to a preceeding step or may be passed to further processing.

In certain batch operations or sporadic operations the number of steps, and the completeness of the separation of oil and water, is done in accordance with whether one wishes substantially water-free oil or oil-free water as the main result. It is recognized by practitioners of the relevant arts that oil and water tend to form two distinct phases and that if all the oil, even that at the phase interface, is to be drained or siphoned off the water, then some of the water may accompany the oil. Conversely, if all the water is to be drained from beneath the oil, then some of the oil at the interface may accompany the water. Either the water phase or the oil phase may be recycled back into the separation process, if desired, after a phase separation step. The silica in the water phase is ordinarily substantially removed for further processing, even though some or all of it may remain with the recycle water, if desired.

In continuous batching (or continuous "tandem") operations the oil/water mixture is treated with the hydrophobic silica thereby forming a silica/oil mixture which floats on the water. The silica/oil mixture is scooped off, vacuumed off, weired, or otherwise removed, and then mixed in a separate reservoir with water where, after a period of time, the hydrophobic silica becomes hydrophilic and goes into the water phase leaving the oil floating on top. The oil is then taken from the water or the water (now containing the silica) is drained from beneath the oil. The silica may be removed from the water by, e.g., generally known methods of filtration and/or centrifugation followed by a drying step. The silica may be put to further use or may be treated to make it hydrophobic again. One method, e.g., is to treat the dry fine-particle silica with anhydrous gaseous HF, thereby making it hydrophobic such as in my co-filed application Ser. No. 730,541 filed Oct. 7, 1976 now U.S. Pat. No. 4,054,689. Also, the silica may be useful as is, e.g., as a filler or in compounding or rubber. The silica may be reacted with aqueous HF to form aq. $H_2SiF_6$ (see, e.g., U.S. Pat. No. 2,535,036) which may be employed as feed to a high temperature pyrolysis to form fumed, hydrophobic $SiO_2$ such as in U.S. Pat. Nos. 2,819,151 or 3,203,759. Such fumed, hydrophobic $SiO_2$ is particularly suitable for use as the fine-particle $SiO_2$ of the present invention.

Continuous operation may be performed by adding the hydrophobic silica to an oil-containing flowing body of water at a given addition point in the flow, then removing the oil-sorbed silica from the flow at a removal point downstream from the addition point, the interval of time between the addition and removal of the silica being less than that required for a change in the silica from hydrophobic to hydrophilic.

The following examples are embodiments illustrative of the practice of the invention but are not all-inclusive of all possible embodiments which will become apparent to practitioners of the invention.

EXAMPLE 1

Four grams of oil having a specific gravity of about 0.8 are spread on the surface of water contained in a 250 ml. beaker. When 0.4 grams of hydrophobic fumed silica containing sorbed HF values are poured on the surface and gently stirred, the fumed silica is not completely wet by the oil and appears to be in excess of what is required to form the oil into a flaky material; a lesser amount of the silica would be sufficient. The so-formed flaky material is easily removed from the water. The flaky oil-sorbed silica, when placed in water overnight releases the silica as the hydrophobicity of the silica is overcome and the silica goes into the water phase, leaving the oil floating on top of the water.

EXAMPLE 2

A gently flowing stream of waste water containing a layer of oil is treated with hydrophobic fine-particle silica in a generally continuous manner and the layer of oil-sorbed silica which forms is continuously skimmed from the surface of the water at a point immediately downstream from the point of addition. Very little of the oil remains in the water flow after the oil-removal step.

The oil-sorbed silica is left standing on water in a separation vessel for several hours, during which time the silica losses it hydrophobicity and enters the water phase, leaving the oil floating on top. The water phase is drained from beneath the oil, the silica is separated for further processing, and the water is cycled for further processing or is sent to the flowing stream of waste water, preferably at a point upstream from the silica-addition point.

The silica from Examples 1 and 2 above are rendered hydrophobic again by being treated with anhydrous, gaseous HF thereby obtaining silica having sorbed HF values. Such "regenerated" hydrophobic silica is reusable for adsorbing oil from water.

What is claimed is:

1. A method for separating oil from water comprising, in sequence, the steps of
    adding to an oil-containing body of water an amount of finely-divided silica, said silica being characterized as containing sorbed HF valus which render the silica hydrophobic,
    the amount of said silica being an amount sufficient to sorb at least a portion of the oil, thereby creating a bouyant layer on the water comprising oil sorbed on hydrophobic silica,
    separating the said bouyant layer from the water,
    adding the hydrophobic silica containing sorbed oil to a body of water,
    allowing the hydrophobic silica to remain in contact with the water until the silica becomes hydrophilic by losing its hydrophobicity, thereby entering into the water phase and releasing the sorbed oil, thus forming an oil layer,
    separating the resultant oil layer from the water, and separating the silica from the water.

2. The method of claim 1 wherein the silica employed is hydrophobic, fumed silica.

3. A method for separating oil from water comprising, in sequence, the steps of
    adding to an oil-containing body of water an amount of finely-divided silica, said silica being characterized as containing sorbed HF values which render the silica hydrophobic,
    the amount of said silica being an amount sufficient to sorb at least a portion of the oil, thereby creating a bouyant layer on the water comprising oil sorbed on hydrophobic silica,
    separating the said bouyant layer from the water,
    adding the said bouyant layer to a body of water,
    allowing the hydrophobic silica to remain in contact with the water until the silica becomes hydrophilic by losing its hydrophobicity, thereby entering into the water phase and releasing the sorbed oil, thus forming an oil layer,
    separating the resultant oil layer from the water,
    separating the silica from the water, and
    rendering the silica re-cyclable by treating it with anhydrous, gaseous HF to renew its hydrophobicity.

4. The method of claim 3 wherein the silica employed is hydrophobic, fumed silica.

* * * * *

UNITED STATES PATENT AND TRADEMARK OFFICE
CERTIFICATE OF CORRECTION

PATENT NO. : 4,151,078
DATED : April 24, 1979
INVENTOR(S) : Donald W. Calvin

It is certified that error appears in the above-identified patent and that said Letters Patent are hereby corrected as shown below:

Column 1, line 12; change "anhyrous" to --anhydrous--.

Column 1, line 21; change "Adside" to --Aside--.

Column 2, line 43; insert --with-- between "off" and "the".

Column 3, line 30; change "or" to --of--.

Column 4, line 8; change "losses" to --loses--.

Column 4, line 8; change "it" to --its--.

Column 4, line 25; change "valus" to --values--.

Signed and Sealed this

*Eighteenth* Day of *September 1979*

[SEAL]

*Attest:*

LUTRELLE F. PARKER
*Attesting Officer*    *Acting Commissioner of Patents and Trademarks*